US012562097B2

(12) United States Patent
Hwang et al.

(10) Patent No.: US 12,562,097 B2
(45) Date of Patent: Feb. 24, 2026

(54) DISPLAY DEVICE AND METHOD OF DRIVING THE SAME

(71) Applicant: Samsung Display Co., Ltd., Yongin-Si (KR)

(72) Inventors: Hyungsuk Hwang, Yongin-si (KR); Youra Kim, Yongin-si (KR); Hyosun Kim, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 60 days.

(21) Appl. No.: 18/585,058

(22) Filed: Feb. 23, 2024

(65) Prior Publication Data

US 2024/0404453 A1 Dec. 5, 2024

(30) Foreign Application Priority Data

May 30, 2023 (KR) ........................ 10-2023-0069534

(51) Int. Cl.

| | |
|---|---|
| ***G09G 3/3233*** | (2016.01) |
| ***G09G 3/20*** | (2006.01) |
| ***G09G 3/3275*** | (2016.01) |

(52) U.S. Cl.

CPC ......... *G09G 3/2096* (2013.01); *G09G 3/3233* (2013.01); *G09G 3/3275* (2013.01);

(Continued)

(58) Field of Classification Search

CPC ... G09G 2320/0285; G09G 2320/0673; G09G 2330/028; G09G 2340/0435; G09G 3/2096; G09G 3/3233; G09G 3/3275; G09G 2300/0819; G09G 2300/0842; G09G 2300/0861; G09G 2310/08; G09G 3/32; G09G 3/3208; G09G 2320/02; G09G 2320/0626; G09G 2330/021; G09G 2300/08; G09G 2320/0276

See application file for complete search history.

(56) References Cited

U.S. PATENT DOCUMENTS 9,007,295 B2 * 4/2015 Kim ..................... G09G 3/3406 345/87

10,133,403 B2 11/2018 Yeh et al.

(Continued)

FOREIGN PATENT DOCUMENTS

CN 113160749 A * 7/2021 ........... G09G 3/3225

CN 113450709 A * 9/2021 ........... G09G 3/3208

(Continued)

*Primary Examiner* — Ricardo Osorio

(74) *Attorney, Agent, or Firm* — Innovation Counsel LLP

(57) ABSTRACT

A display device includes a display panel that emits light in response to a panel driving signal, a panel driver that provides the panel driving signal to the display panel, and a driving controller that receives an image signal at a current frame rate and controls driving of the panel driver based on the image signal and a control signal. The driving controller includes a comparing unit that compares a reference frame rate and the current frame rate and outputs a duty control signal when the current frame rate is less than the reference frame rate, a duty control unit that controls a current duty ratio of a current emission period of the display panel based on the duty control signal, and a luminance control unit that controls luminance of each of the pixels based on the current duty ratio.

15 Claims, 12 Drawing Sheets

(52) U.S. Cl.
CPC ............... *G09G 2300/0819* (2013.01); *G09G 2300/0842* (2013.01); *G09G 2300/0861* (2013.01); *G09G 2310/08* (2013.01); *G09G 2320/0285* (2013.01); *G09G 2320/0673* (2013.01); *G09G 2330/028* (2013.01); *G09G 2340/0435* (2013.01)

(56) References Cited

U.S. PATENT DOCUMENTS

| | | | | |
|---|---|---|---|---|
| 10,810,930 | B2 | 10/2020 | Shim et al. | |
| 10,971,086 | B2 | 4/2021 | Le et al. | |
| 11,508,305 | B2 | 11/2022 | Lin et al. | |
| 2012/0154682 | A1* | 6/2012 | Yamashita | G09G 3/3233<br>348/E9.037 |
| 2015/0138258 | A1* | 5/2015 | Lee | G09G 3/3225<br>345/691 |
| 2021/0142723 | A1* | 5/2021 | Yamashita | G09G 3/3225 |
| 2023/0351960 | A1* | 11/2023 | Nakamura | G09G 3/3266 |

FOREIGN PATENT DOCUMENTS

| | | | |
|---|---|---|---|
| KR | 10-1450909 | B1 | 10/2014 |
| KR | 10-2018-0059017 | A | 6/2018 |
| KR | 10-2018476 | B1 | 10/2019 |

* cited by examiner

DISPLAY DEVICE AND METHOD OF DRIVING THE SAME

CROSS-REFERENCE TO RELATED APPLICATIONS

This application claims priority under 35 U.S.C. § 119 to Korean Patent Application No. 10-2023-0069534, filed on May 30, 2023, in the Korean Intellectual Property Office, the disclosure of which is incorporated by reference herein in its entirety.

BACKGROUND

Embodiments of the present disclosure relate to display devices and methods of driving the display devices, and more particularly, relate to display devices capable of improving the quality of images and methods of driving the same.

A light emitting display device may display an image using light emitting diodes that generate light through the recombination of electrons and holes. Advantages of light emitting display devices include low power consumption and fast response speeds.

A light emitting display device may include pixels connected to data lines and scan lines. Each of the pixels may include, in general, a light emitting diode and a circuit unit for controlling the amount of current flowing to the light emitting diode. In response to a data signal, the circuit unit may particularly control the amount of current that flows from a first driving voltage to a second driving voltage through the light emitting diode. In this case, the light emitting diode generates light having a luminance corresponding to the amount of current flowing through the light emitting diode.

SUMMARY

Embodiments of the present disclosure provide display devices capable of improving the quality of images in a variable frequency mode of operation and methods of driving the display devices.

According to an embodiment, a display device may include a display panel that includes a plurality of pixels each emitting light in response to a panel driving signal, a panel driver that provides the panel driving signal to the display panel, and a driving controller that receives an image signal at a current frame rate and controls driving of the panel driver based on the image signal and a control signal.

The driving controller includes a comparing unit that compares a reference frame rate and the current frame rate and outputs a duty control signal when the current frame rate is less than the reference frame rate, a duty control unit that controls a current duty ratio of a current emission period of the display panel based on the duty control signal, and a luminance control unit that controls luminance of each of the pixels based on the current duty ratio.

According to an embodiment, a driving method of a display device includes receiving an image signal at a current frame rate, comparing the current frame rate and a reference frame rate, outputting a duty control signal when the current frame rate is less than the reference frame rate, controlling a current duty ratio of a current emission period of a display panel based on the duty control signal, outputting a luminance control signal based on the current duty ratio, and controlling luminance of each of pixels provided in the display panel in response to the luminance control signal.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
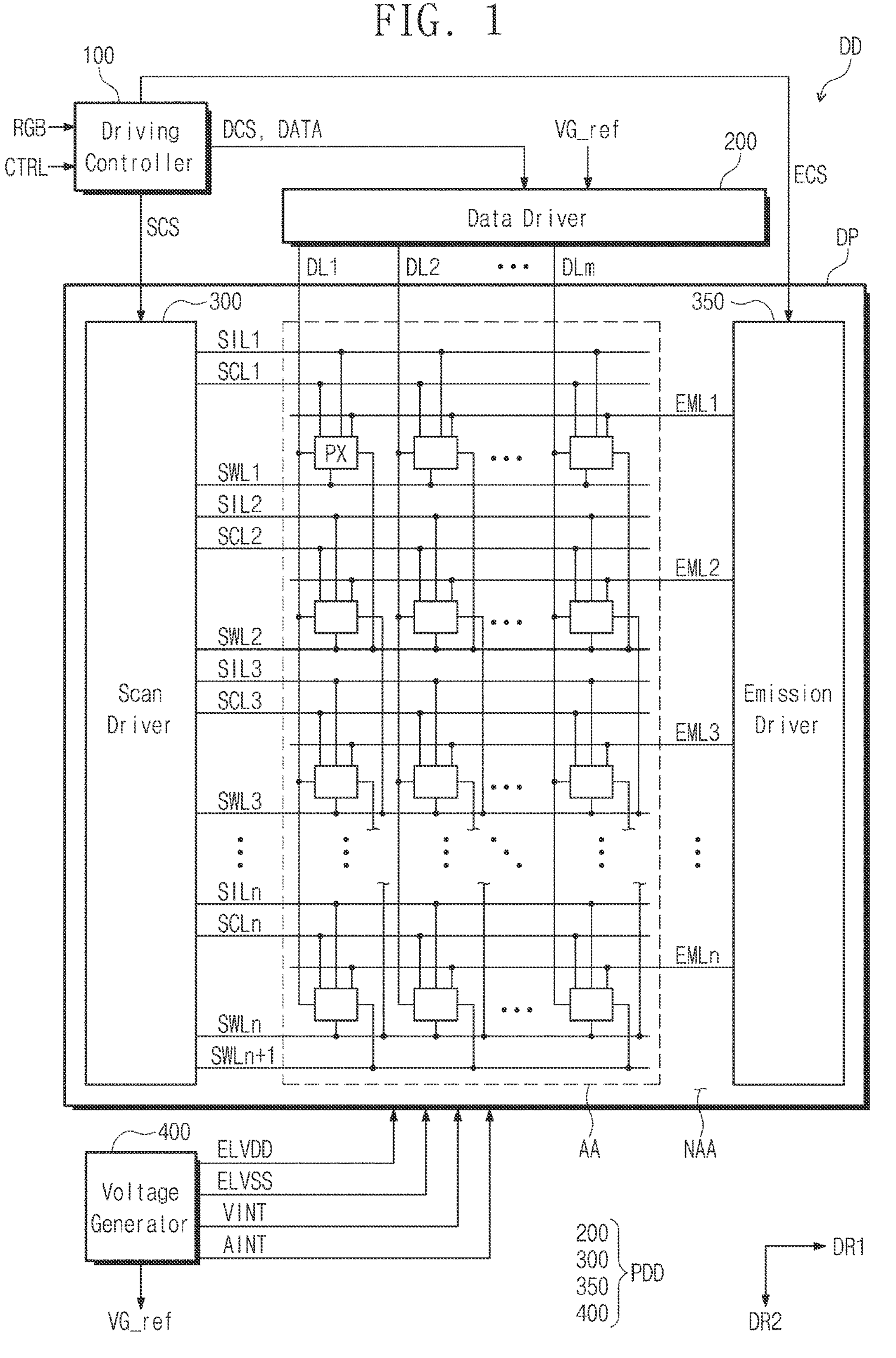
FIG. 1 is a block diagram of a display device according to an embodiment of the present disclosure.

In the following, a first component (or area, layer, part, portion, etc.) being "on", "connected with", or "coupled to" a second component means that the first component may be directly on, connected with, or coupled to the second component or means that a third component is disposed between the first component and the second component.

Like reference numerals refer to like components. Also, in the drawings, the thickness, ratio, and dimension of components may be exaggerated or altered for effectiveness of description of technical contents.

Although the terms "first", "second", etc. may be used to describe various components, the components should not be construed as being limited by these terms. The terms are only used to distinguish one component from another component. For example, a first component may be referred to as a "second component", and similarly, the second component may be referred to as the "first component." The articles "a," "an," and "the" are singular in that they have a single referent, but the use of the singular form in the specification should not preclude the presence of more than one referent.

The term "and/or" includes one or more combinations in each of which associated elements are defined. Also, the terms "under", "below", "on", "above", etc. may be used to describe the correlation of components illustrated in drawings. The terms are relative and may only be described with reference to a direction indicated in the drawing.

It will be further understood that the terms "comprises", "includes", "have", etc. specify the presence of stated features, numbers, steps, operations, elements, components, or a combination thereof but do not preclude the presence or addition of one or more other features, numbers, steps, operations, elements, components, or a combination thereof.

Unless otherwise defined, all terms (including technical terms and scientific terms) used in herein have the same meaning as commonly understood by one skilled in the art to which the present disclosure belongs. Furthermore, terms such as terms defined in the dictionaries commonly used should be interpreted as having a meaning consistent with the meaning in the context of the related technology and should not be interpreted in ideal or overly formal meanings unless explicitly defined herein.

Below, embodiments of the present disclosure will be described with reference to drawings.

FIG. 1 is a block diagram of a display device according to an embodiment of the present disclosure.

Referring to FIG. 1, a display device DD includes a display panel DP, a panel driver PDD, and a driving controller 100. The display panel DP includes a plurality of pixels PX. Each of the plurality of pixels PX may receive a panel driving signal from the panel driver PDD and may emit light in response to the panel driving signal. The panel driver PDD may generate the panel driving signal necessary to drive the display panel DP and provide the panel driving signal thus generated to the display panel DP. According to an embodiment of the present disclosure, the panel driver PDD includes a data driver 200, a scan driver 300, an emission driver 350, and a voltage generator 400. In this case, the panel driving signal may include a data signal, a scan signal, an emission control signal, and various voltages.

The driving controller 100 may receive an image signal RGB and a control signal CTRL from a host processor (not shown). According to an embodiment of the present disclosure, the host processor may include one or more of a central processing unit (CPU) or an application processor (AP). The host processor may further include one or more of a graphic processing unit (GPU), a communication processor (CP), and an image signal processor (ISP).

The driving controller 100 may include an interface conversion circuit and a timing control circuit. The driving controller 100 generates image data DATA by converting a data format of the image signal RGB to a format suitable or required for an interface with the data driver 200. The control signal CTRL may include a vertical synchronization signal, an input data enable signal, a master clock signal, etc. The driving controller 100 may generate a first driving control signal SCS, a second driving control signal DCS, and a third driving control signal ECS based on the control signal CTRL.

The data driver 200 receives the second driving control signal DCS and the image data DATA from the driving controller 100. The data driver 200 may further receive a gamma reference voltage VG_ref from the voltage generator 400. The data driver 200 converts the image data DATA into data signals based on the gamma reference voltage VG_ref and outputs the data signals to a plurality of data lines DL1 to DLm described further below. The data signals may be analog voltages corresponding to grayscale values of the image data DATA.

The scan driver 300 receives the first driving control signal SCS from the driving controller 100. The scan driver 300 may output scan signals to scan lines in response to the first driving control signal SCS.

The voltage generator 400 generates various voltages necessary for the operation of the display panel DP. In an embodiment, the voltage generator 400 generates a first driving voltage ELVDD, a second driving voltage ELVSS, a first initialization voltage VINT, a second initialization voltage AINT, and the gamma reference voltage VG_ref.

The display panel DP further includes initialization scan lines SIL1 to SILn, compensation scan lines SCL1 to SCLn, write scan lines SWL1 to SWLn+1, emission control lines EML1 to EMLn, and the data lines DL1 to DLm. An area of the display panel DP may be partitioned into an effective area AA and a non-effective area NAA. The initialization scan lines SIL1 to SILn, the compensation scan lines SCL1 to SCLn, the write scan lines SWL1 to SWLn+1, the emission control lines EML1 to EMLn, the data lines DL1 to DLm, and the pixels PX may overlap the effective area AA. The initialization scan lines SIL1 to SILn, the compensation scan lines SCL1 to SCLn, the write scan lines SWL1 to SWLn+1, and the emission control lines EML1 to EMLn extend in a first direction DR1. The initialization scan lines SIL1 to SILn, the compensation scan lines SCL1 to SCLn, the write scan lines SWL1 to SWLn+1, and the emission control lines EML1 to EMLn are arranged to be spaced from each other in a second direction DR2. The data lines DL1 to DLm extend in the second direction DR2 and are arranged to be spaced from each other in the first direction DR1.

The plurality of pixels PX are electrically connected to the initialization scan lines SIL1 to SILn, the compensation scan lines SCL1 to SCLn, the write scan lines SWL1 to SWLn+1, the emission control lines EML1 to EMLn, and the data lines DL1 to DLm. Each of the plurality of pixels PX may be electrically connected to four scan lines. For example, as illustrated in FIG. 1, the pixels PX belonging to the first row may be connected to the first initialization scan line SIL1, the first compensation scan line SCL1, and the first and second write scan lines SWL1 and SWL2. Also, the pixels PX belonging to the second row may be connected to the second initialization scan line SIL2, the second compensation scan line SCL2, and the second and third write scan lines SWL2 and SWL3. However, the number of scan lines connected to each pixel PX may be variously changed or modified and are not limited to the example four scan lines shown in FIG. 1. Alternatively, each of the plurality of pixels PX may be electrically connected to five scan lines; in which case, the display panel DP may further include black scan lines.

The scan driver 300 and the emission driver 350 may be disposed in the non-effective area NAA of the display panel DP. In response to the first driving control signal SCS, the scan driver 300 may output initialization scan signals to the initialization scan lines SIL1 to SILn, may output compensation scan signals to the compensation scan lines SCL1 to SCLn, and may output write scan signals to the write scan lines SWL1 to SWLn+1.

The emission driver 350 receives the third driving control signal ECS from the driving controller 100. The emission driver 350 may output emission control signals to the emission control lines EML1 to EMLn in response to the third driving control signal ECS. In another embodiment, the scan driver 300 may be connected to the emission control lines EML1 to EMLn. In this case, the scan driver 300 may output the emission control signals to the emission control lines EML1 to EMLn.

Each of the plurality of pixels PX may include a light emitting element ED (refer to FIG. 7) and a pixel circuit unit PXC (refer to FIG. 7) controlling the emission of the light emitting element ED. The pixel circuit unit PXC may include a plurality of transistors and a capacitor. The scan driver 300 and the emission driver 350 may include transistors formed through the same process that forms the pixel circuit units PXC.

Each of the plurality of pixels PX receives the first driving voltage ELVDD, the second driving voltage ELVSS, the first initialization voltage VINT, and the second initialization voltage AINT from the voltage generator 400.

The display device DD may operate in a normal frequency mode (or a first mode) in which a driving frequency is fixed (i.e., is not variable) or may operate in a variable frequency mode (or a second mode) in which the driving frequency is variable. In the variable frequency mode, the driving frequency may vary to correspond to the frame rate. Operation of the display device DD in the variable frequency mode is described in more detail below.

Figure 2:
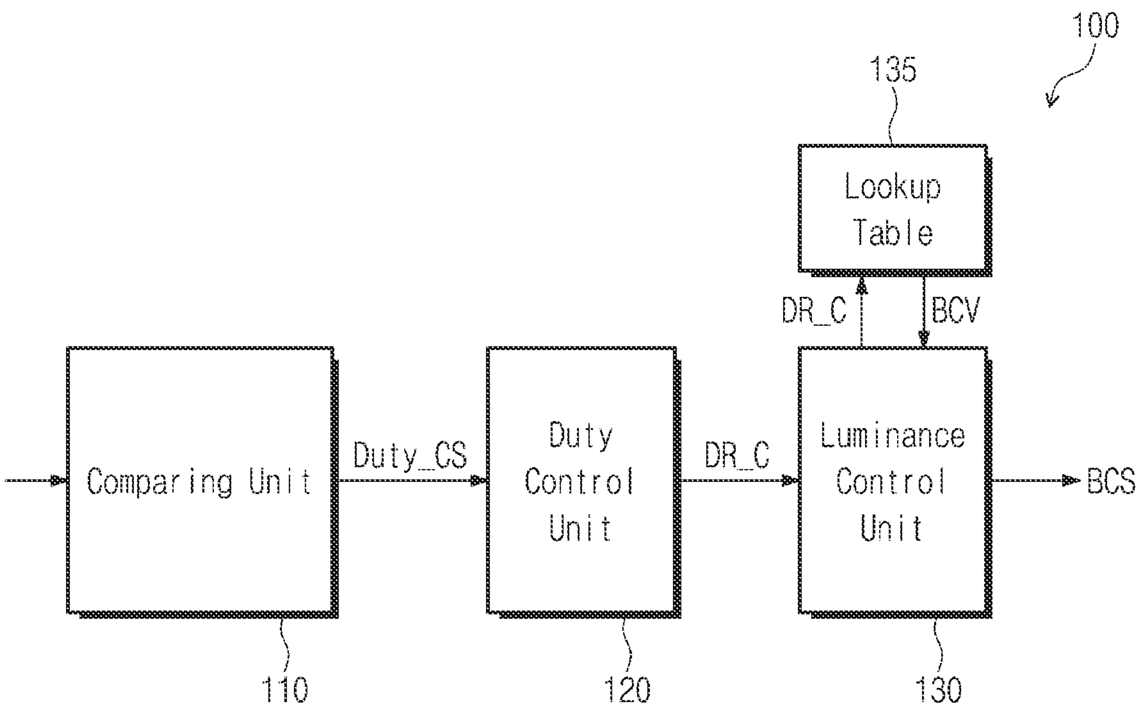
FIG. 2 is a block diagram of a driving controller according to an embodiment of the present disclosure.
Figure 3A:
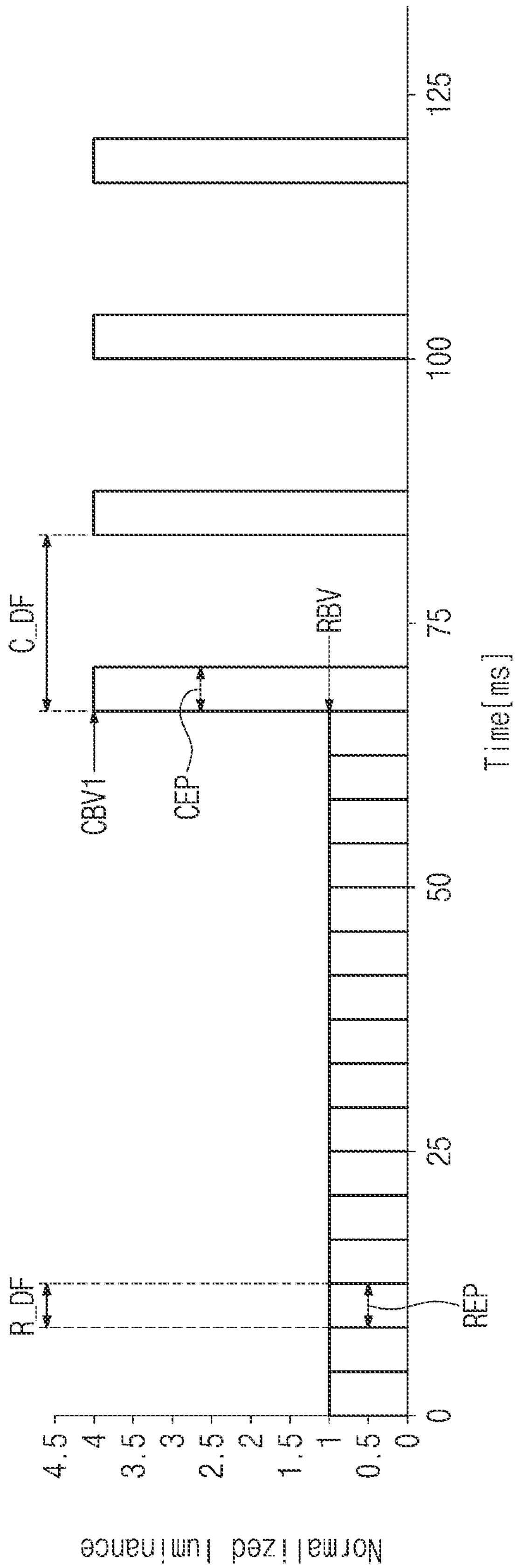
FIGS. 3A and 3B are timing diagrams for describing operation of a display device according to an embodiment of the present disclosure.
Figure 3B:
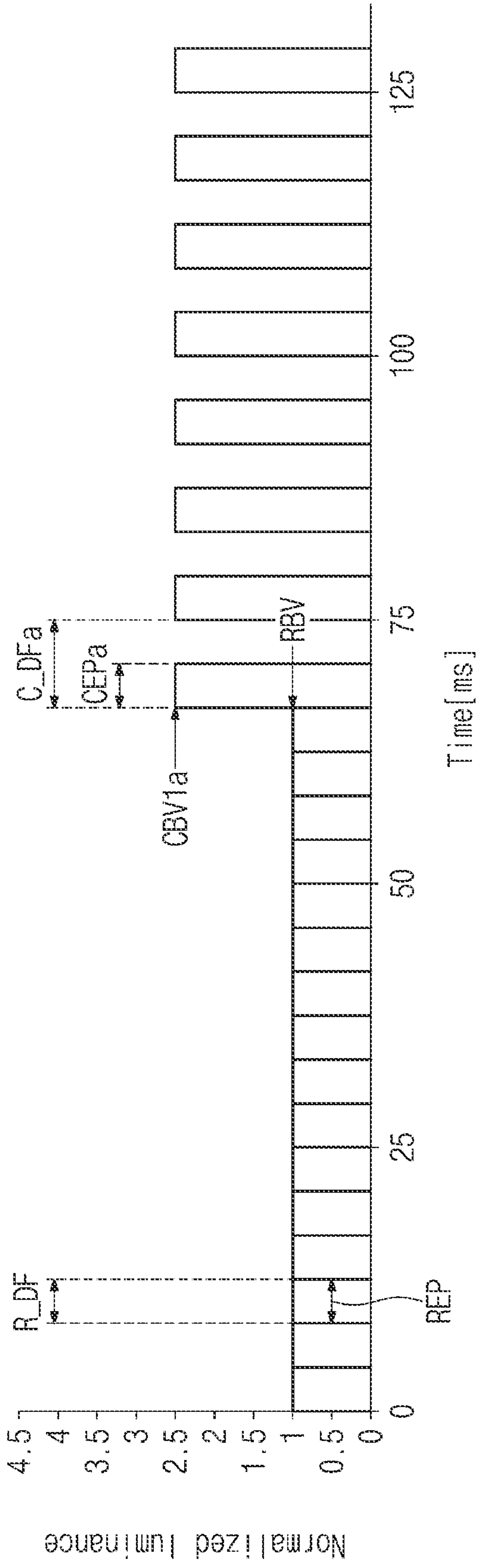

FIG. 2 is a block diagram of a driving controller according to an embodiment of the present disclosure. FIGS. 3A and 3B are timing diagrams for describing operation of a display device according to an embodiment of the present disclosure.

Referring to FIGS. 1, 2, and 3A, the driving controller 100 may support the variable frequency mode. In the variable frequency mode, the host processor may provide the image signal RGB to the driving controller 100 at a variable frame rate. The driving controller 100 that supports the variable frequency mode may control the driving of the panel driver PDD in synchronization with the variable frame rate, and thus, the display device DD may display an image at the variable frame rate.

According to an embodiment of the present disclosure, a frame rate being the highest from among variable frame rates supported in the variable frequency mode may be referred to as a "reference frame rate." A period by which the driving controller 100 outputs the image data DATA to the data driver 200 may be defined herein as a driving frame. In the variable frequency mode, the duration of the driving frame may vary depending on the frame rate. For example, when the frame rate is 240 Hz, the duration of the driving frame may be about 4.167 ms; when the frame rate is 60 Hz, the duration of the driving frame may be about 16.7 ms. According to an embodiment of the present disclosure, the reference frame rate may be set to 480 Hz, 360 Hz, 240 Hz, 120 Hz, etc.

The driving controller 100 may receive the image signal RGB at a current frame rate. The current frame rate may be less than or equal to the reference frame rate.

The driving controller 100 includes a comparing unit 110, a duty control unit 120, and a luminance control unit 130. The reference frame rate may be set in advance in the comparing unit 110. The comparing unit 110 may receive information about the current frame rate. The comparing unit 110 may receive the information about the current frame rate from the host processor. However, the present disclosure is not limited thereto. The information about the current frame rate may be generated within the driving controller 100.

The comparing unit 110 may compare the reference frame rate and the current frame rate, and when the current frame rate is less than the reference frame rate, the comparing unit 110 may output a duty control signal Duty_CS. The duty control unit 120 may control a current duty ratio DR_C of a current emission period CEP of the display panel DP based on the duty control signal Duty_CS. The current emission period CEP that is a period included in a current frame C_DF may be a period of the current frame C_DF, in which the display panel DP substantially emits light. The current duty ratio DR_C may be defined as a ratio or a percentage of the current frame C_DF that the current emission period CEP occupies in the current frame C_DF.

The driving controller 100 may receive the image signal RGB at the reference frame rate in a reference frame R_DF. The reference frame R_DF may further indicate a reference emission period REP, and the reference emission period REP may be a period of the reference frame R_DF, in which the display panel DP substantially emits light. The reference emission period REP may have a reference duty ratio, and the reference duty ratio may be defined as a ratio of the reference emission period REP to the duration of the reference frame R_DF. According to an embodiment of the present disclosure, the duration of the reference emission period REP may be equal to the duration of the reference frame R_DF. In this case, the reference duty ratio may be 100%.

When the current frame rate is less than the reference frame rate, the duration of the current frame C_DF may be greater than the duration of the reference frame R_DF.

The duty control unit 120 may receive the duty control signal Duty_CS from the comparing unit 110 and may control the magnitude of the current duty ratio DR_C in response to the duty control signal Duty_CS. According to an embodiment of the present disclosure, when the current frame rate is less than the reference frame rate, the duty control unit 120 may control the magnitude of the current duty ratio DR_C such that the current duty ratio DR_C is greater in magnitude than the reference duty ratio.

When the reference frame rate is p times the current frame rate, the current duty ratio DR_C may be 1/p times the reference duty ratio. Herein, "p" may be a number greater than 1. According to an embodiment of the present disclosure, "p" may be 2, 2.5, 4, 5, etc.

As illustrated in FIG. 3A, when the reference frame rate is 240 Hz and the current frame rate is 60 Hz, "p" may be 4, and the current duty ratio DR_C may be ¼ times the reference duty ratio. That is, when the reference duty ratio is 100%, the current duty ratio DR_C may be 25%. Even though the duration of the current frame C_DF is 4 times the duration of the reference frame R_DF, because the current duty ratio DR_C decreases to ¼ of the reference duty ratio, the duration of the current emission period CEP may be equal to the duration of the reference emission period REP.

As illustrated in FIG. 3B, when the reference frame rate is 240 Hz and the current frame rate is 120 Hz, "p" may be 2, and the current duty ratio DR_C may be ½ times the reference duty ratio. That is, when the reference duty ratio is 100%, the current duty ratio DR_C may be 50%. Even though the duration of a current frame C_DFa is 2 times the duration of the reference frame R_DF, because the current duty ratio DR_C decreases to ½ times the reference duty ratio, the duration of a current emission period CEPa may be equal to the duration of the reference emission period REP.

According to an embodiment of the present disclosure, when the reference frame rate is p times the current frame rate, the duration of the current frame C_DF or C_DFa may be p times greater than the duration of the reference frame R_DF. In this case, the duration of the reference emission period REP may be equal to the duration of the current emission period CEP or CEPa. That is, even though the duration of the current frame C_DF or C_DFa is different from the duration of the reference frame R_DF, the current emission period CEP or CEPa may be maintained to have the same duration as the reference emission period REP.

An issue or problem in conventional variable-framerate display devices is that the duration of motion blur may vary for each frequency due to a duration difference of emission periods in the variable frequency mode. The difference or variation in motion blur reduces the quality of images and can cause a user in an AR or VR environment to become dizzy. An embodiment of the present disclosure may improve image quality and address issues or problems associated with prior display devices. In other words, the problem of the quality of image being reduced due to a difference between motion blur lengths or the dizziness that may be caused in the AR and VR environment may be solved or improved by an embodiment of the present disclosure.

Referring again to FIGS. 1, 2 and 3A, the luminance control unit 130 may control the luminance of each of the pixels PX based on the current duty ratio DR_C.

The driving controller 100 may further include a lookup table 135 in which luminance correction values differently set depending on magnitudes of the duty ratio are stored. The luminance control unit 130 may receive a luminance correction value BCV corresponding to the current duty ratio DR_C from the lookup table 135 and may output a luminance control signal BCS based on the luminance correction value BCV.

The panel driver PDD may adjust the panel driving signal supplied to the display panel DP in response to the luminance control signal BCS, and thus, the luminance of each of the pixels PX may be varied or adjusted.

In an embodiment of the present disclosure, luminance that each pixel has in the current emission period CEP may be referred to as a "current luminance value," and luminance that each pixel has in the reference emission period REP may be referred to as a "reference luminance value" RBV. When the reference frame rate is p times the current frame rate, the current duty ratio DR_C may be 1/p times the reference duty ratio, and the current luminance value CBV1 may be p times the reference luminance value RBV.

When the reference frame rate is 240 Hz and the current frame rate is 60 Hz, the current duty ratio DR_C may decrease to ¼ times the reference duty ratio. To compensate for the reduction of the power of emitted light due to the decrease in the duty ratio, the luminance control unit 130 may output the luminance control signal BCS such that the luminance of each pixel is higher to compensates for the reduced emission duration. As an embodiment of the present disclosure, when the current duty ratio DR_C decreases to ¼ times the reference duty ratio, the current luminance value CBV1 may be 4 times greater than the reference luminance value RBV.

As illustrated in FIGS. 3B, when the reference frame rate is 240 Hz and the current frame rate is 120 Hz, the current duty ratio DR_C may decrease to ½ times the reference duty ratio. When the current duty ratio DR_C decreases to ½ times the reference duty ratio, a current luminance value CBV1*a* may be 2 times greater than the reference luminance value RBV.

As an embodiment of the present disclosure, when a current frame rate is less than a reference frame rate, the current duty ratio DR_C may be adjusted to be less than the reference duty ratio, but the current luminance value CBV1 or CBV1*a* may be increased to be greater than the reference luminance value RBV so that a drop in average intensity of emitted light is avoided. Accordingly, in the variable frequency mode, the reduction of luminance may be prevented while improving the issue that the quality of image is reduced due to a difference between motion blur lengths for each frequency.

Figure 4A:
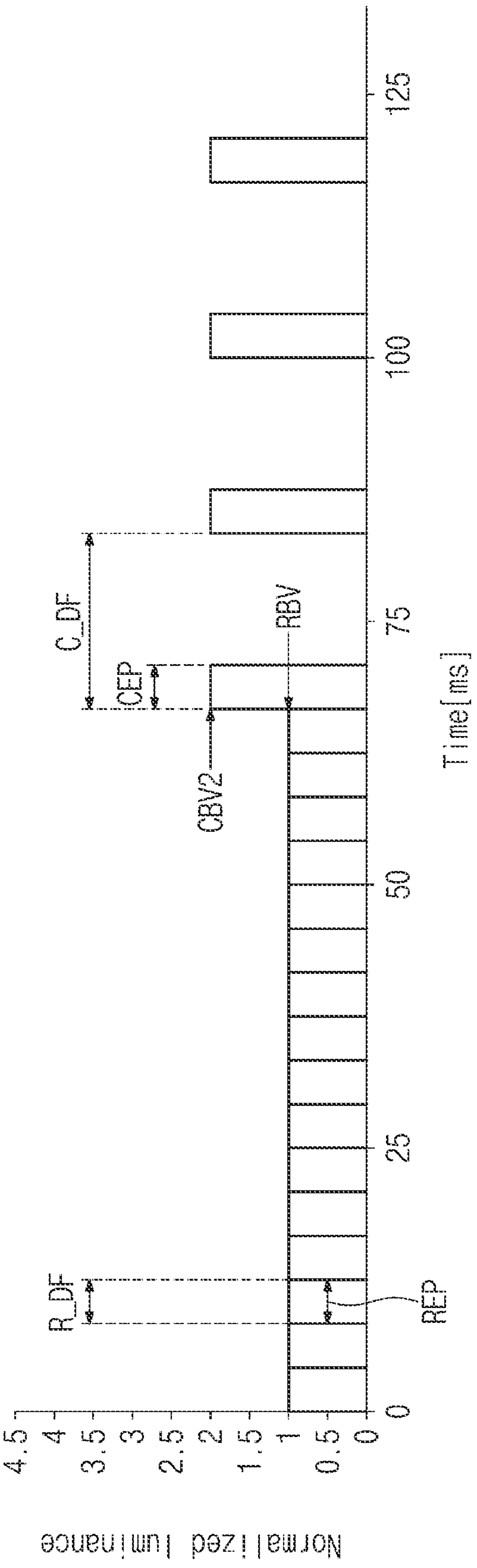
FIGS. 4A and 4B are timing diagrams for describing operation of a display device according to an embodiment of the present disclosure.
Figure 4B:
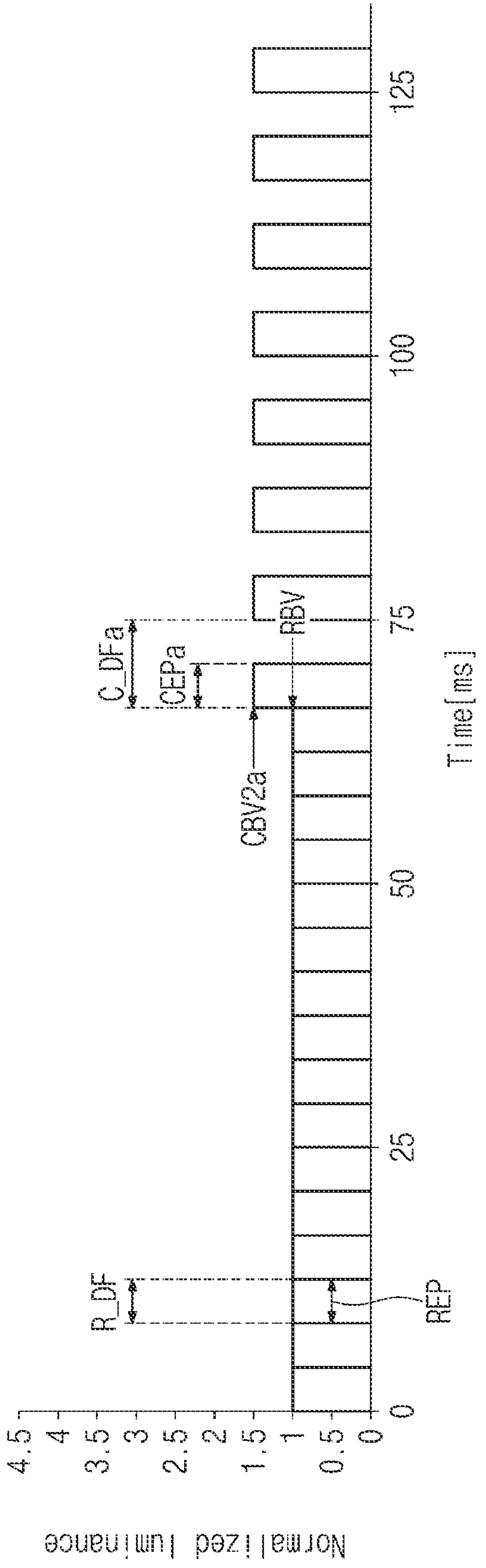

FIGS. 4A and 4B are timing diagrams for describing operation of a display device according to an embodiment of the present disclosure.

As illustrated in FIGS. 2 and 4A, when the reference frame rate is p times the current frame rate, the current duty ratio DR_C may be 1/p times the reference duty ratio, and a current luminance value CBV2 may be k times the reference luminance value RBV. Herein, "k" may be a number greater than 1 and different from "p," e.g., k may depend on the luminance correction value BCV from the lookup table 135. For example, when "p" is 4, "k" may be 2; when "p" is 2, "k" may be 1.5.

When the reference frame rate is 240 Hz and the current frame rate is 60 Hz, the current duty ratio DR_C may decrease to ¼ times the reference duty ratio. As an embodiment of the present disclosure, when the current duty ratio DR_C decreases to ¼ times the reference duty ratio, the current luminance value CBV2 may be 2 times greater than the reference luminance value RBV.

As illustrated in FIGS. 4B, when the reference frame rate is 240 Hz and the current frame rate is 120 Hz, the current duty ratio DR_C may decrease to ½ times the reference duty ratio. When the current duty ratio DR_C decreases to ½ times the reference duty ratio, a current luminance value CBC2*a* may be 1.5 times greater than the reference luminance value RBV.

In an embodiment of the present disclosure, when a current frame rate is less than a reference frame rate, the current duty ratio DR_C may be adjusted to be less than the reference duty ratio, but the decrease in luminance in the current frame may be compensated for or prevented by increasing the current luminance value CBV2/CBV2*a* to be greater than the reference luminance value RBV. Accordingly, in the variable frequency mode, a reduction of luminance may be prevented while reducing or avoiding loss of image quality that might otherwise result from differences between motion blur lengths for each frequency.

Figure 5:
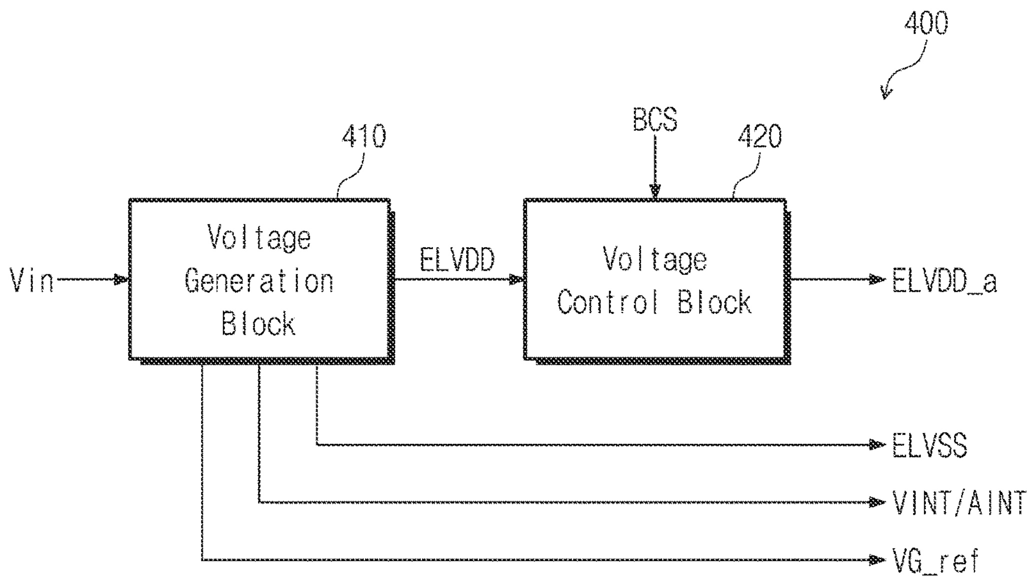
FIG. 5 is a block diagram of a voltage generator according to an embodiment of the present disclosure.
Figure 6:
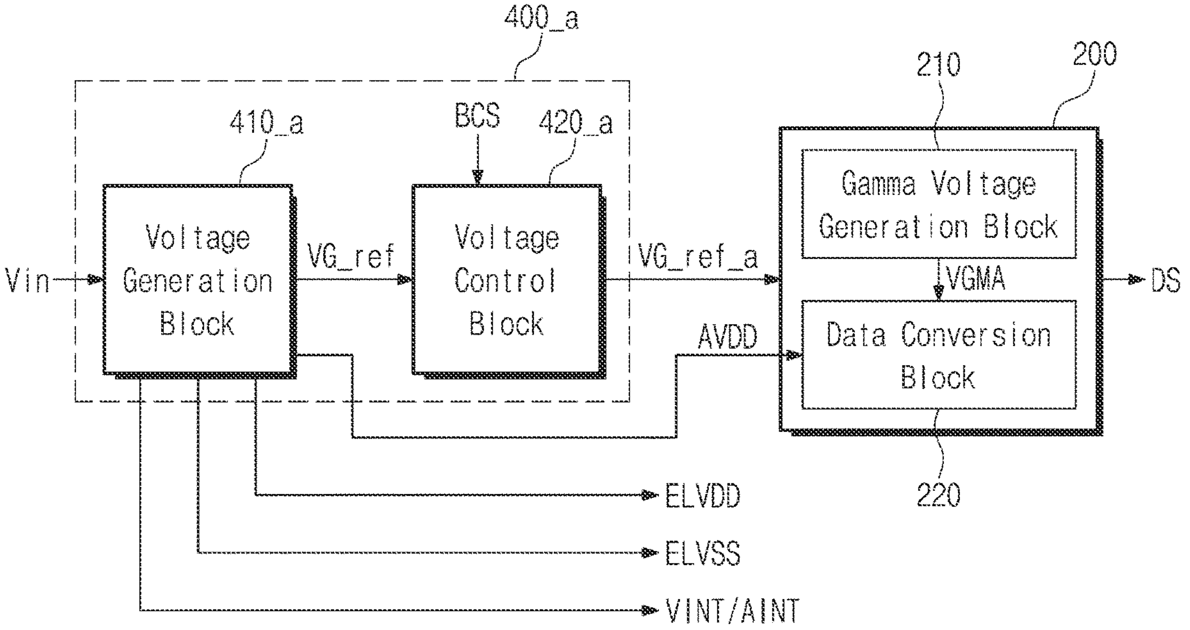
FIG. 6 is a block diagram of a voltage generator and a data driver according to an embodiment of the present disclosure.

FIG. 5 is a block diagram of a voltage generator according to an embodiment of the present disclosure, and FIG. 6 is a block diagram of a voltage generator and a data driver according to an embodiment of the present disclosure.

Referring to FIG. 5, the voltage generator 400 according to an embodiment of the present disclosure includes a voltage generation block 410 and a voltage control block 420.

The voltage generation block 410 may receive an input voltage Vin and may generate various voltages necessary to drive the display device DD (refer to FIG. 1) based on the input voltage Vin. According to an embodiment of the present disclosure, the voltage generation block 410 may generate the first driving voltage ELVDD, the second driving voltage ELVSS, the first and second initialization voltages VINT and AINT, the gamma reference voltage VG_ref, etc.

The voltage control block 420 may receive one or more voltages among the various voltages generated by the voltage generation block 410. An example in which the voltage control block 420 receives the first driving voltage ELVDD is illustrated in FIG. 5, but the present disclosure is not limited thereto. For example, the first and second driving voltages ELVDD and ELVSS may be provided to the voltage control block 420, or the gamma reference voltage VG_ref may be provided to the voltage control block 420.

The voltage control block 420 may receive the luminance control signal BCS from the luminance control unit 130 (refer to FIG. 2) of the driving controller 100. According to an embodiment of the present disclosure, the voltage control block 420 may control the voltage level of the first driving voltage ELVDD in response to the luminance control signal BCS. When the first and second driving voltages ELVDD and ELVSS are provided to the voltage control block 420, the voltage control block 420 may control the voltage level of each of the first and second driving voltages ELVDD and ELVSS in response to the luminance control signal BCS. For example, to make the current luminance value CBV1 (refer to FIG. 3A) higher than the reference luminance value RBV (refer to FIG. 3A), the voltage control block 420 may increase the voltage level of the first driving voltage ELVDD to output a compensation driving voltage ELVDD_a. Accordingly, the luminance of each pixel PX (refer to FIG. 1) may increase without changing the grayscale of a data signal.

Also, the level of the compensation driving voltage ELVDD_a may change depending on the magnitude of the current luminance value CBV1/CBV1*a*. For example, the level of the compensation driving voltage ELVDD_a generated when the current luminance value CBV1 is 4 times the reference luminance value RBV may be higher than the level of the compensation driving voltage ELVDD_a generated when the current luminance value CBV1 is 2 times the reference luminance value RBV.

Referring to FIG. 6, a voltage generator 400_*a* according to an embodiment of the present disclosure includes a voltage generation block 410_*a* and a voltage control block 420_*a*. The voltage generation block 410_*a* may generate the first driving voltage ELVDD, the second driving voltage ELVSS, the first and second initialization voltages VINT and AINT, the gamma reference voltage VG_ref, and a data driving voltage AVDD, etc.

The gamma reference voltage VG_ref may be provided to the voltage control block 420_*a*. The voltage control block 420_*a* may control the voltage level of the gamma reference voltage VG_ref in response to the luminance control signal BCS. As an embodiment of the present disclosure, the gamma reference voltage VG_ref may include a high gamma reference voltage (or a first gamma reference voltage) and a low gamma reference voltage (or a second gamma reference voltage). The voltage control block 420_*a* may control the voltage level of at least one of the low gamma reference voltage and the high gamma reference voltage. For example, to make the current luminance value CBV1 (refer to FIG. 3A) higher than the reference luminance value RBV (refer to FIG. 3A), the voltage control block 420_*a* may output a compensation gamma reference voltage VG_ref_a obtained by increasing the voltage level of the high gamma reference voltage or decreasing the voltage level of the low gamma reference voltage.

The data driver 200 includes a gamma voltage generation block 210 and a data conversion block 220. The gamma voltage generation block 210 may generate a plurality of gamma voltages VGMA based on the compensation gamma reference voltage VG_ref_a. The gamma voltages VGMA may be supplied to the data conversion block 220. The data conversion block 220 may receive the image data DATA (refer to FIG. 1) from the driving controller 100 (refer to FIG. 1). Accordingly, the data conversion block 220 may convert the image data DATA into a data signal (or an analog data voltage) DS based on the gamma voltages VGMA and the data driving voltage AVDD. Even though the image data DATA of the same grayscale are received, when the voltage levels of the gamma voltages VGMA change, the voltage level of the data signal DS may also change depending on the change in the voltage levels of the gamma voltages VGMA. Herein, the voltage levels of the gamma voltages VGMA may be determined by the gamma reference voltage VG_ref. As an embodiment of the present disclosure, the high gamma reference voltage may determine the voltage level of the maximum gamma voltage among the gamma voltages VGMA, and the low gamma reference voltage may determine the voltage level of the minimum gamma voltage among the gamma voltages VGMA. When the voltage level of one of the high and low gamma reference voltages changes, the voltage levels of the gamma voltages VGMA output from the gamma voltage generation block 210 may change.

As such, the luminance of each pixel PX (refer to FIG. 1) may increase without the change in the grayscale of the data signal DS by controlling the voltage level of the gamma reference voltage VG_ref.

Figure 7:
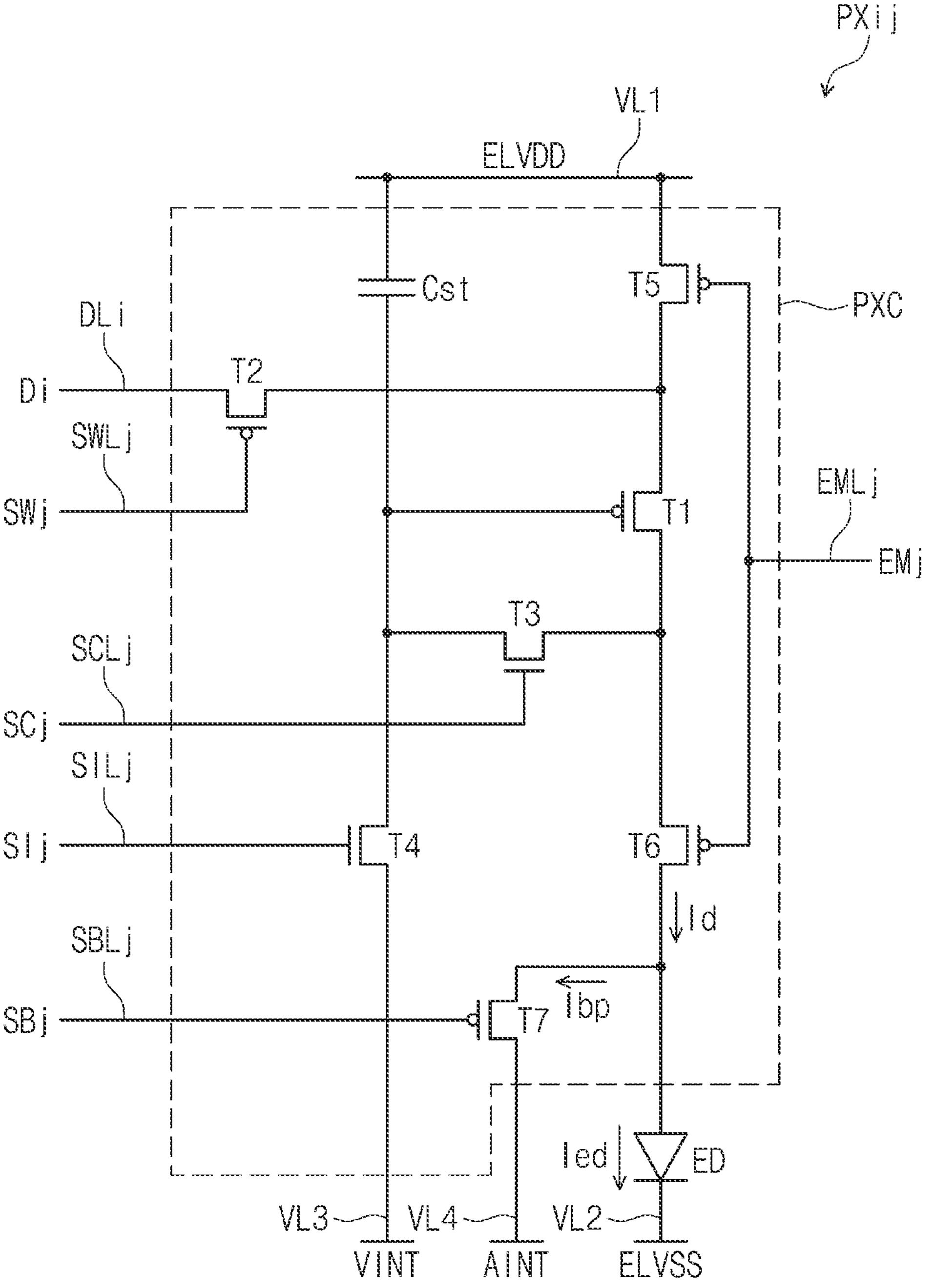
FIG. 7 is a circuit diagram of a pixel according to an embodiment of the present disclosure.
Figure 8A:
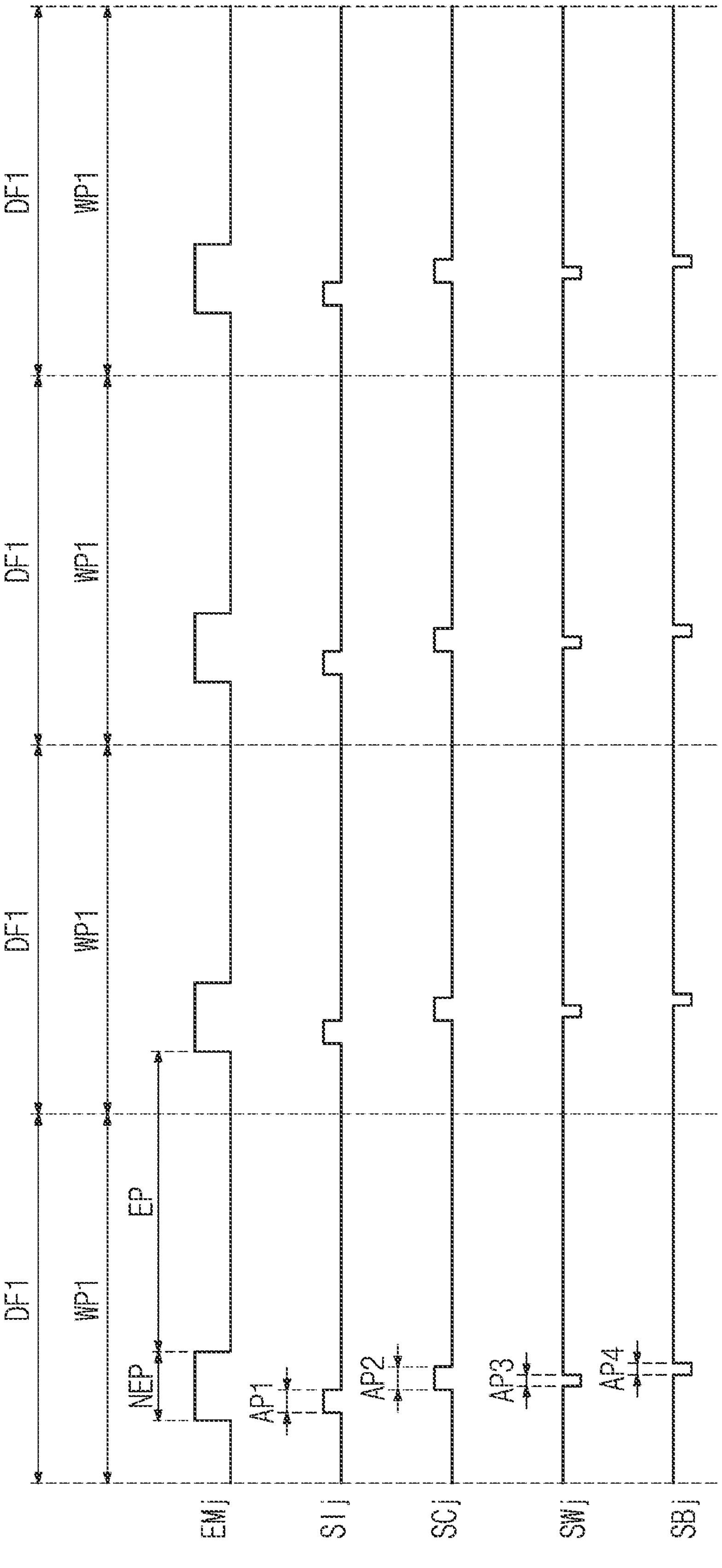
FIGS. 8A, 8B, and 8C are timing diagrams for describing operation of a display device according to an embodiment of the present disclosure.
Figure 8B:
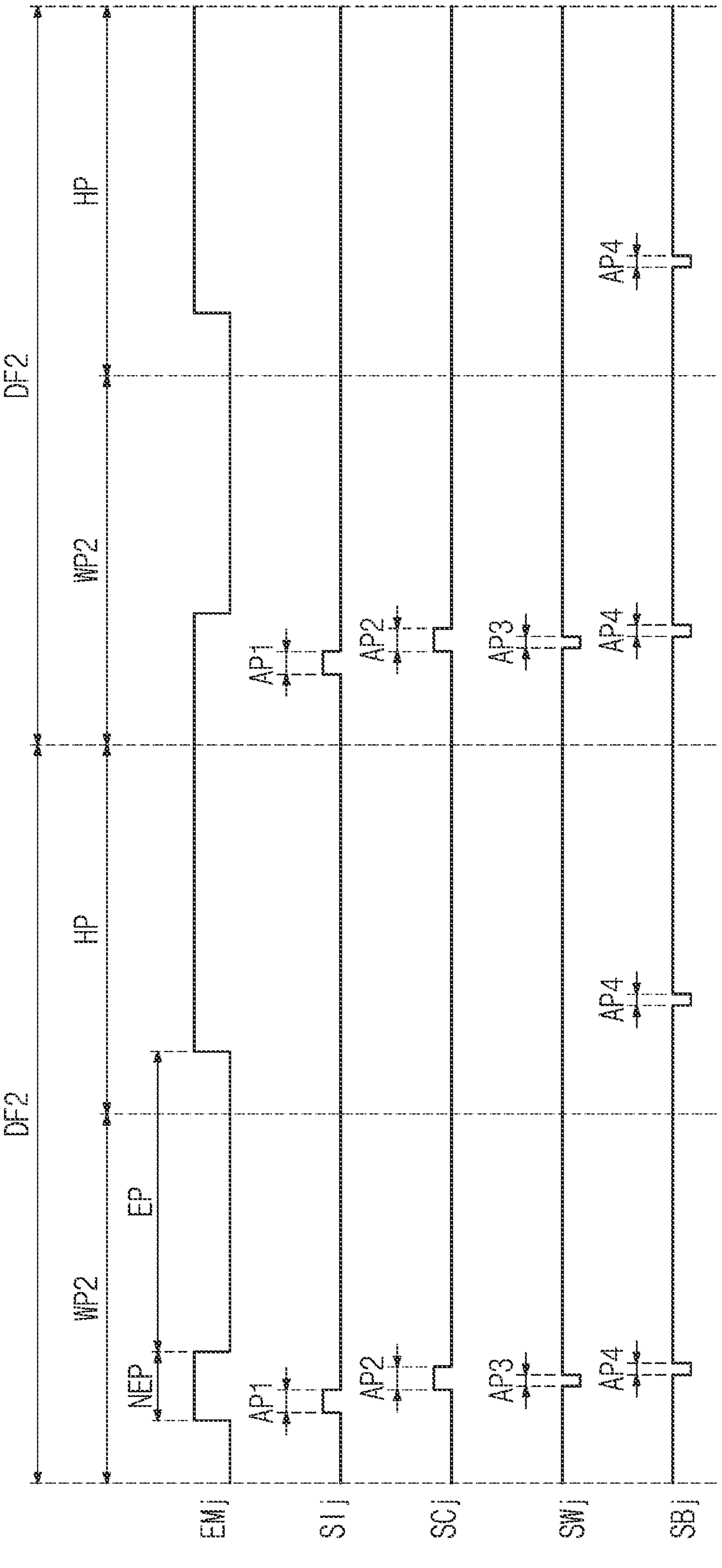
Figure 8C:
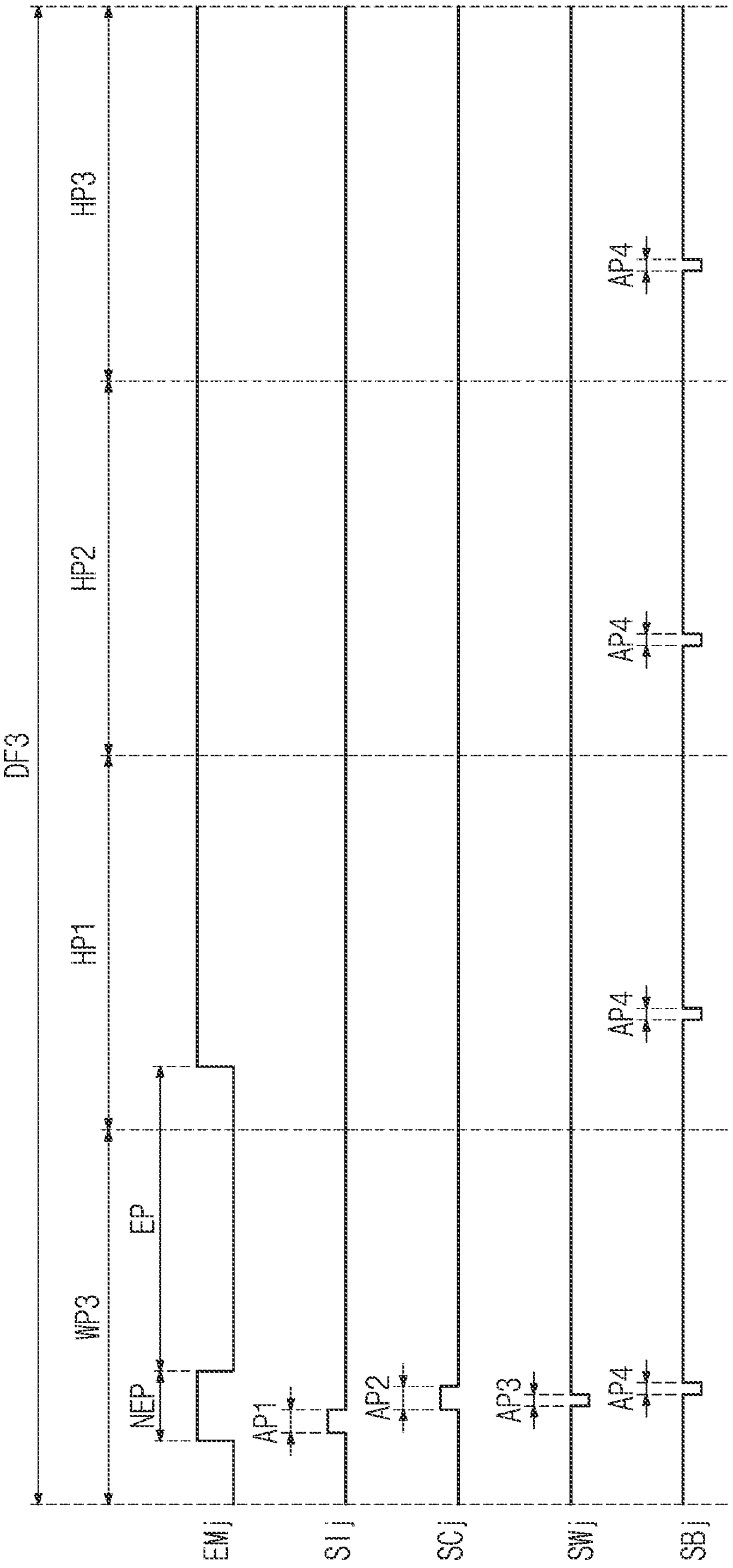

FIG. 7 is a circuit diagram of a pixel according to an embodiment of the present disclosure, and FIGS. 8A, 8B, and 8C are timing diagrams for describing an operation of a display device according to an embodiment of the present disclosure.

An equivalent circuit diagram of one pixel PXij of the plurality of pixels PX illustrated in FIG. 1 is illustrated in FIG. 7 as an example. The plurality of pixels PX have the same structure, and thus, additional description associated with the remaining pixels PX other than the pixel PXij will be omitted to avoid redundancy.

Referring to FIG. 7, the pixel PXij is connected to the i-th data line (hereinafter referred to as a "data line") DLi of the data lines DL1 to DLm and the j-th emission control line (hereinafter referred to as an "emission control line") EMLj of the emission control lines EML1 to EMLn. The pixel PXij is connected to the j-th initialization scan line (hereinafter referred to as an "initialization scan line") SILj of the initialization scan lines SIL1 to SILn, the j-th write scan line (hereinafter referred to as a "write scan line") SWLj of the write scan lines SWL1 to SWLn+1, and a j-th black scan line (hereinafter referred to as a "black scan line") SBLj. Also, the pixel PXij is connected to the j-th compensation scan line (hereinafter referred to as a "compensation scan line") SCLj of the compensation scan lines SCL1 to SCLn. Alternatively, the pixel PXij may be connected to the (j+1)-th write scan line instead of the j-th black scan line SBLj.

The pixel PXij includes the light emitting element ED and the pixel circuit unit PXC. The light emitting element ED may be a light emitting diode. The light emitting diode may include an organic light emitting material, an inorganic light emitting material, a quantum dot, a quantum rod, or the like as an emission layer.

The pixel circuit unit PXC includes first to seventh transistors T1, T2, T3, T4, T5, T6, and T7 and a single capacitor Cst. At least one of the first to seventh transistors T1 to T7 may be a transistor having a low-temperature polycrystalline silicon (LTPS) semiconductor layer. Alternatively, at least one of the first to seventh transistors T1 to T7 may be a transistor having an oxide semiconductor layer. Some or all of the first to seventh transistors T1 to T7 may be P-type transistors, and any remaining transistors may be N-type transistors. For example, among the first to seventh transistors T1 to T7, the first, second, and fifth to seventh transistors T1, T2, and T5 to T7 may be P-type transistors, and the third and fourth transistors T3 and T4 may be N-type transistors. However, a configuration of the pixel circuit unit PXC according to the present disclosure is not limited to the embodiment illustrated in FIG. 7. The pixel circuit unit PXC illustrated in FIG. 7 is provided only as an example, and the configuration of the pixel circuit unit PXC may be modified in various embodiments. For example, all of the first to seventh transistors T1 to T7 may be P-type transistors or N-type transistors. Also, in the pixel circuit unit PXC, the number of transistors and the number of capacitors may be variously changed and modified.

The initialization scan line SILj, the compensation scan line SCLj, the write scan line SWLj, the black scan line SBLj, and the emission control line EMLj may respectively transfer to the pixel PXij a j-th initialization scan signal (hereinafter referred to as an "initialization scan signal") SIj, a j-th compensation scan signal (hereinafter referred to as a "compensation scan signal") SCj, a j-th write scan signal (hereinafter referred to as a "write scan signal") SWj, a j-th black scan signal (hereinafter referred to as a "black scan signal") SBj, and a j-th emission control signal (hereinafter referred to as an "emission control signal") EMj. The data line DLi transfers an i-th data signal Di to the pixel PXij. The i-th data signal Di may have a voltage level corresponding to a grayscale of a relevant image signal belonging to the image signal RGB input to the display device DD (refer to FIG. 1). First to fourth driving voltage lines VL1, VL2, VL3, and VL4 may respectively transfer the first driving voltage first driving voltage ELVDD, the second driving voltage ELVSS, the first initialization voltage VINT, and the second initialization voltage AINT to the pixel PXij.

The first transistor T1 includes a first electrode connected to the first driving voltage line VL1 through the fifth transistor T5, a second electrode electrically connected to an anode of the light emitting element ED through the sixth transistor T6, and a gate electrode connected to a first electrode of the capacitor Cst. The electrode of the first transistor T1 may receive the i-th data signal Di transferred through the data line DLi depending on a switching operation of the second transistor T2 and may supply a driving current Id through the sixth transistor T6 to the light emitting element ED.

The second transistor T2 includes a first electrode connected to the data line DLi, a second electrode connected to the first electrode of the first transistor T1, and a gate electrode connected to the write scan line SWLj. The second transistor T2 may be turned on depending on the write scan signal SWj transferred through the write scan line SWLj and then may transfer the i-th data signal Di from the data line DLi to the first electrode of the first transistor T1.

The third transistor T3 includes a first electrode connected to the second electrode of the first transistor T1, a second electrode connected to the gate electrode of the first transistor T1, and a gate electrode connected to the compensation scan line SCLj. The third transistor T3 may be turned on depending on the compensation scan signal SCj transferred through the compensation scan line SCLj, and thus, the gate electrode and the second electrode of the first transistor T1 may be connected to each other, that is, the first transistor T1 may be diode-connected.

The fourth transistor T4 includes a first electrode connected to the gate electrode of the first transistor T1, a second electrode connected to the third driving voltage line VL3 through which the first initialization voltage VINT is transferred, and a gate electrode connected to the initialization scan line SILj. The fourth transistor T4 may be turned on depending on the initialization scan signal SIj transferred through the initialization scan line SILj, and thus, the first initialization voltage VINT may be transferred to the gate electrode of the first transistor T1. As such, a voltage of the gate electrode of the first transistor T1 may be initialized. This operation may be referred to as an "an initialization operation".

The fifth transistor T5 includes a first electrode connected to the first driving voltage line VL1, a second electrode connected with the first electrode of the first transistor T1, and a gate electrode connected to the emission control line EMLj.

The sixth transistor T6 includes a first electrode connected to the second electrode of the first transistor T1, a second electrode connected to the anode of the light emitting element ED, and a gate electrode connected to the emission control line EMLj.

The fifth transistor T5 and the sixth transistor T6 are simultaneously turned on in response to the emission control signal EMj transferred through the emission control line EMLj. The first driving voltage ELVDD applied through the turned-on fifth transistor T5 may be transferred to the light emitting element ED after compensated through the diode-connected first transistor T1.

The seventh transistor T7 includes a first electrode connected to the second electrode of the sixth transistor T6, a second electrode connected to the fourth driving voltage line VL4 through which the second initialization voltage AINT is transferred, and a gate electrode connected to the black scan line SBLj.

The first electrode of the capacitor Cst is connected to the gate electrode of the first transistor T1 as described above, and a second electrode of the capacitor Cst is connected to the first driving voltage line VL1. A cathode of the light emitting element ED may be connected to the second driving voltage line VL2 transferring the second driving voltage ELVSS.

Referring to FIGS. 7, 8A, 8B, and 8C, the display panel DP (refer to FIG. 1) may display an image at a first driving frequency (or a reference frame rate) during a set of first driving frames (or reference frames) DF1 as shown in FIG. 8A. Each first driving frame DF1 may include a first write frame WP1. In the variable frequency mode, the driving frequency of the display panel DP may be variable. For example, the display panel DP may display an image at a second driving frequency (or a first current frame rate) during a set of second driving frames (or first current frames) DF2 as shown in FIG. 8B. Also, the display panel DP may display an image at a third driving frequency (or a second current frame rate) during a third driving frame (or a second current frame) DF3 as shown in FIG. 8C. As an embodiment of the present disclosure, the first driving frequency may be higher than the second driving frequency, and the second driving frequency may be higher than the third driving frequency. For example, when the first driving frequency is two times the second driving frequency, each second driving frame DF2 may include a second write frame WP2 and one holding frame HP as shown in FIG. 8B. When the first driving frequency is four times the third driving frequency, the third driving frame DF3 may include a third write frame WP3 and include three holding frames HP1, HP2, and HP3. Each of the second and third write frames WP2 and WP3 may have the same duration as the first write frame WP1.

The plurality of scan signals SIj, SCj, SWj, and SBj may be activated during the first to third write frames WP1, WP2, and WP3. In detail, the initialization scan signal SIj includes a first active period AP1 having the high level in the first to third write frames WP1, WP2, and WP3, and the compensation scan signal SCj includes a second active period AP2 having the high level in the first to third write frames WP1, WP2, and WP3. The write scan signal SW includes a third active period AP3 having the low level in the first to third write frames WP1, WP2, and WP3, and the black scan signal SBj includes a fourth active period AP4 having the low level in the first to third write frames WP1, WP2, and WP3. According to an embodiment of the present disclosure, the black scan signal SBj may further include a fourth active period AP4 having the low level in the holding frames HP and HP1 to HP3 in addition to the first to third write frames WP1, WP2, and WP3. That is, some scan signals SIj, SCj, and SWj among the plurality of scan signals SIj, SCj, SWj, and SBj may have the same frequency as the corresponding driving frame, and the remaining scan signal SBj may have the same frequency as the reference frequency.

When the initialization scan signal SIj of the high level is provided to the initialization scan line SILj during the first active period AP1, the fourth transistor T4 is turned on in response to the initialization scan signal SIj of the high level. The first initialization voltage VINT is transferred to the gate electrode of the first transistor T1 through the turned-on fourth transistor T4, and the gate electrode of the first transistor T1 is initialized by the first initialization voltage VINT.

Next, when the compensation scan signal SCj of the high level is supplied through the compensation scan line SCLj during the second active period AP2, the third transistor T3 is turned on. During the second active period AP2, the first transistor T1 is diode-connected by the third transistor T3 turned on and is forward-biased. The second active period AP2 of the compensation scan signal SCj may not overlap the first active period AP1 of the initialization scan signal SIj. Also, the first active period AP1 of the initialization scan signal SIj may precede the second active period AP2 of the compensation scan signal SCj.

According to an embodiment of the present disclosure, the second active period AP2 of the compensation scan signal SCj is defined as a period where the compensation scan signal SCj has the high level, and the first active period AP1 of the initialization scan signal SIj is defined as a period where the initialization scan signal SIj has the high level. When the third and fourth transistors T3 and T4 are P-type transistors, the second active period AP2 of the compensation scan signal SCj is defined as a period where the compensation scan signal SCj has the low level, and the first active period AP1 of the initialization scan signal SIj is defined as a period where the initialization scan signal SIj has the low level.

The second active period AP2 may overlap the third active period AP3 in which the write scan signal SWj is set to the low level. During the third active period AP3, the second transistor T2 is turned on by the write scan signal SWj of the low level. In this case, the gate of the first transistor T1 and the connected electrode of the capacitor Cst obtain a compensation voltage “Di-Vth” that results from subtracting the threshold voltage Vth of the first transistor T1 from the voltage of the i-th data signal Di supplied from the data line DLi to the gate electrode of the first transistor T1. That is, the potential of the gate electrode of the first transistor T1 may be set to the compensation voltage “Di-Vth”.

The first driving voltage ELVDD and the compensation voltage “Di-Vth” may be respectively applied to opposite ends of the capacitor Cst, and the capacitor Cst may store charges corresponding to a voltage difference of the opposite ends of the capacitor Cst.

Afterwards, during the fourth active period AP4, the seventh transistor T7 is turned by the black scan signal SBj of the low level supplied through the black scan line SBLj. A portion of the driving current Id may be drained through the seventh transistor T7 as a bypass current Ibp.

Assuming the case where the pixel PXij displays a black image, in the case where the light emitting element ED emits light in response to a minimum driving current of the first transistor T1 flowing as the driving current Id, the pixel PXij fails to normally display a black image. Accordingly, the seventh transistor T7 of the pixel PXij according to an embodiment of the present disclosure may drain a portion of the minimum driving current of the first transistor T1 to a current path, which is different from a current path to the light emitting element ED, as the bypass current Ibp. Herein, the minimum driving current of the first transistor T1 means a current flowing to the first transistor T1 under the condition that a gate-source voltage Vgs of the first transistor T1 is less than the threshold voltage Vth, that is, the first transistor T1 is turned off. As the minimum driving current (e.g., a current of about 10 pA or less) flowing to the first transistor T1 is transferred to the light emitting element ED under the condition that the first transistor T1 is turned off, an image of a black grayscale is displayed. In the case where the pixel PXij displays the black image, the bypass current Ibp has a relatively large influence on the minimum driving current; in contrast, in the case where the pixel PXij displays an image such as a normal image or a white image, the influence of the bypass current Ibp on the driving current Id may be negligible. Accordingly, when the pixel PXij displays a black image, a current (i.e., an emission current led), which is obtained by subtracting the amount of the bypass current Ibp flowing through the seventh transistor T7 from the driving current Id, may be provided to the light emitting element ED, and thus, the black image may be clearly displayed. Accordingly, the pixel PXij may implement an accurate black grayscale image by using the seventh transistor T7, and thus, a contrast ratio may be improved.

The emission control signal EMj that is supplied from the emission control line EMLj may include an emission period EP and a non-emission period NEP. As an embodiment of the present disclosure, the emission period EP may be a low-level period, and the non-emission period NEP may be a high-level period. The non-emission period NEP of the emission control signal EMj may overlap the first to fourth active periods AP1, AP2, AP3, and AP4 in the first to third write frames WP1, WP2, and WP3. The emission period EP of the emission control signal EMj may not overlap the first to fourth active periods AP1, AP2, AP3, and AP4. When the operation is performed at the second driving frequency, the emission period EP of the emission control signal EMj may overlap the holding frame HP. When the operation is performed at the third driving frequency, the emission period EP of the emission control signal EMj may overlap the first holding frame HP1 among the holding frames HP1, HP2, and HP3.

The fifth transistor T5 and the sixth transistor T6 are turned on by the emission control signal EMj of the low level. In this case, the driving current Id is generated depending on a difference between the gate voltage of the gate electrode of the first transistor T1 and the first driving voltage ELVDD and is then supplied to the light emitting element ED through the sixth transistor T6. Accordingly, the emission current led flows through the light emitting element ED during the emission period EP, and thus, a light luminance that corresponds to the emission current led may be output from the light emitting element ED.

The emission period EP of the emission control signal EMj when the operation is performed at the first driving frequency may have the same duration as the emission period EP of the emission control signal EMj when the operation is performed at the second or third driving frequency. Even though the driving frequency varies in the variable frequency mode, the duration of the emission period EP may be maintained uniformly. That is, even though the driving frequency is variable, the duration of the emission period where light is output from the light emitting element ED may be maintained uniformly. Accordingly, the variable frequency mode can avoid the reduction in the quality of image that might otherwise result from differences in motion blur lengths for each frequency.

Figure 9:
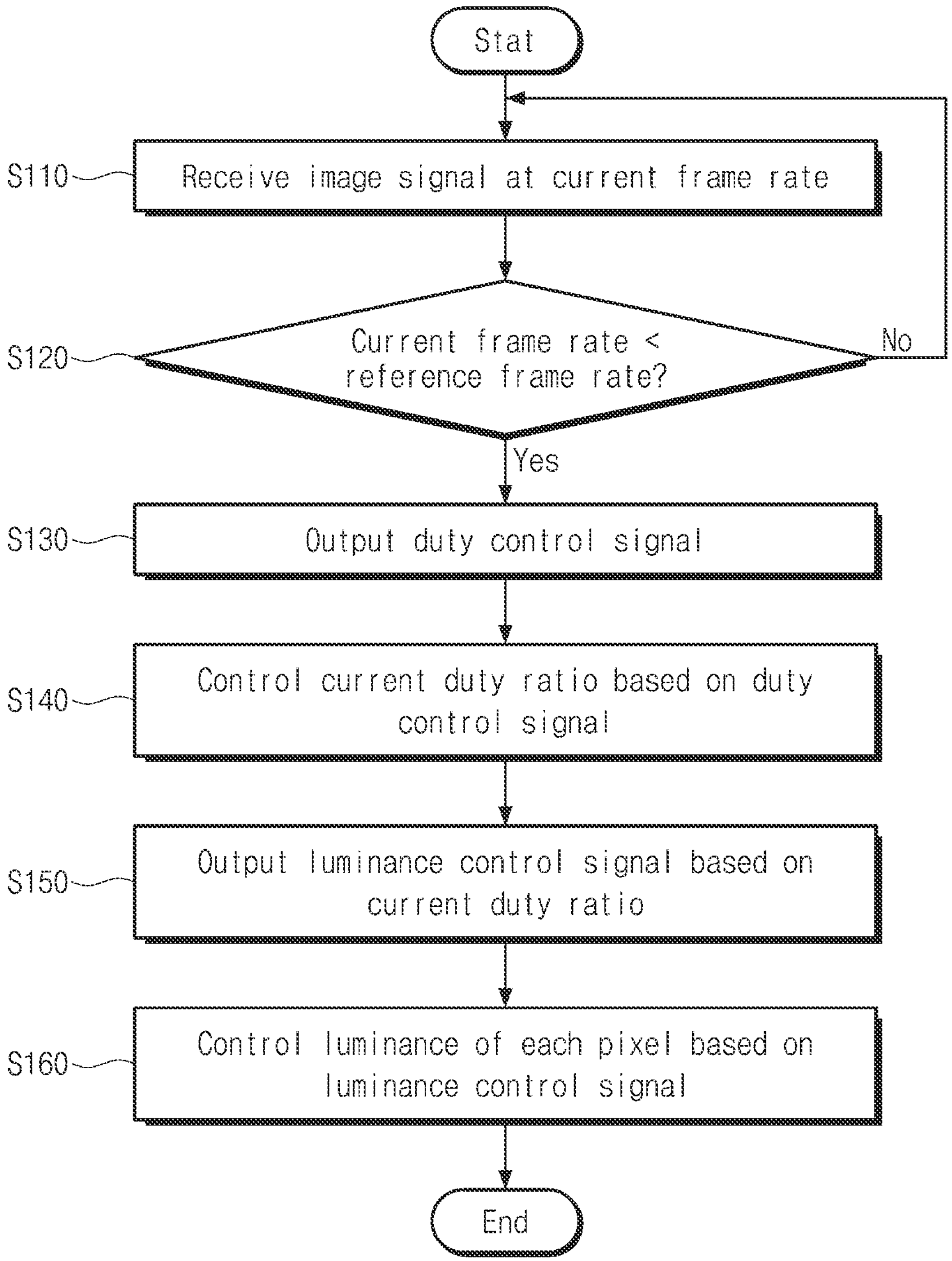
FIG. 9 is a flowchart illustrating operation of a display device according to an embodiment of the present disclosure.

FIG. 9 is a flowchart illustrating operation of a display device according to an embodiment of the present disclosure.

Referring to FIGS. 1, 2, and 9, the driving controller 100 of the display device DD receives the image signal RGB at a current frame rate (S110). Afterwards, the current frame rate and the reference frame rate may be compared through the comparing unit 110 (S120).

When the comparison result indicates that the current frame rate is less than the reference frame rate, the comparing unit 110 may output the duty control signal Duty_CS (S130). The duty control unit 120 may control the current duty ratio DR_C of a current emission period of the display panel DP based on the duty control signal Duty_CS (S140).

That is, when the current frame rate is less than the reference frame rate, the duration of the current frame C_DF (refer to FIG. 3A) may be greater than the duration of the reference frame R_DF (refer to FIG. 3A), but the current duty ratio DR_C may be adjusted by the duty control unit 120 so as to be less than the reference duty ratio. Accordingly, even though the frame rate varies, the duration of the current emission period CEP (refer to FIG. 3A) may be maintained to be equal to the duration of the reference emission period REP (refer to FIG. 3A).

Afterwards, the luminance control unit 130 outputs the luminance control signal BCS based on the current duty ratio DR_C (S150). The luminance control unit 130 may receive the luminance correction value BCV corresponding to the current duty ratio DR_C from the lookup table 140 where luminance correction values differently set depending on magnitudes of the duty ratio are stored and may generate the luminance control signal BCS based on the luminance correction value BCV.

The panel driver PDD may control the luminance of each of the pixels PX provided in the display panel DP in response to the luminance control signal BCS (S160). As an embodiment of the present disclosure, the voltage generator 400 may adjust the voltage level of the first driving voltage ELVDD or the gamma reference voltage VG_ref for the purpose of controlling the luminance of each of the pixels PX provided in the display panel DP in response to the luminance control signal BCS.

According to the present disclosure, when a current frame rate is less than a reference frame rate, a motion blur length may be prevented from varying for each driving frequency by adjusting the current duty ratio to be less than the reference duty ratio. Accordingly, an issue that the quality of image is reduced due to a difference between motion blur lengths for respective frequencies in a variable frequency mode.

Also, when a current duty ratio decreases, luminance may be compensated for, and thus, an issue that the entire luminance of a display panel decreases at a current frame may be improved.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel including a plurality of pixels each emitting light in response to a panel driving signal;

a panel driver configured to provide the panel driving signal to the display panel; and a driving controller configured to receive an image signal at a current frame rate and to control driving of the panel driver based on the image signal and a control signal, wherein the driving controller includes:

a comparing unit configured to compare a reference frame rate and the current frame rate and to output a duty control signal when the current frame rate is less than the reference frame rate;

a duty control unit configured to control a current duty ratio of a current emission period of the display panel based on the duty control signal; and a luminance control unit configured to control luminance of each of the pixels based on the current duty ratio, wherein a reference frame operating at the reference frame rate includes a reference emission period, wherein a current frame operating at the current frame rate includes the current emission period, wherein the current frame rate is less than the reference frame rate, a duration of the current frame is greater than a duration of the reference frame, wherein the current duty ratio is a ratio of the current emission period to the duration of the current frame, wherein a reference duty ratio is a ratio of the reference emission period to the duration of the reference frame, wherein the current duty ratio is less than the reference duty ratio, and wherein a duration of the reference emission period is equal to a duration of the current emission period.

2. The display device of claim 1, wherein, when the reference frame rate is p times the current frame rate, the current duty ratio is 1/p times the reference duty ratio, p being a number greater than 1.

3. The display device of claim 1, wherein the reference frame includes a first write frame, wherein the current frame includes a second write frame and at least one holding frame, and wherein a duration of the first write frame is equal to a duration of the second write frame.

4. The display device of claim 3, wherein the panel driving signal includes an emission control signal applied to the pixels, and wherein the emission control signal includes:

an emission period corresponding to the reference emission period in the reference frame; and an emission period corresponding to the current emission period in the current frame.

5. The display device of claim 4, wherein the emission control signal maintains an inactive state during the at least one holding frame, and wherein a light emitting element included in each of the pixels maintains a non-emission state during the at least one holding frame.

6. The display device of claim 1, wherein the display panel includes:

a scan driver configured to output a scan signal to the display panel; and an emission driver configured to output an emission control signal to the display panel, and wherein the duty control unit provides the emission driver with an emission driving signal determining whether to activate the emission control signal, based on the duty control signal.

7. An electronic device comprising:

a display panel including a plurality of pixels each emitting light in response to a panel driving signal;

a panel driver configured to provide the panel driving signal to the display panel;

a driving controller configured to receive an image signal at a current frame rate and to control driving of the panel driver based on the image signal and a control signal; and a processor configured to provide the image signal and the control signal to the driving controller, wherein the driving controller includes:

a comparing unit configured to compare a reference frame rate and the current frame rate and to output a duty control signal when the current frame rate is less than the reference frame rate;

a duty control unit configured to control a current duty ratio of a current emission period of the display panel based on the duty control signal; and a luminance control unit configured to control luminance of each of the pixels based on the current duty ratio, wherein the driving controller further includes:

a lookup table in which luminance correction values differently set depending on magnitudes of duty ratios are stored, and wherein the luminance control unit is configured to:

receive a luminance correction value corresponding to the current duty ratio from the lookup table; and output a luminance control signal based on the luminance correction value.

8. The electronic device of claim 7, wherein each of the plurality of pixels includes:

a light emitting element;

a first transistor connected between a voltage line to which a driving voltage is supplied and the light emitting element; and a second transistor connected between a data line to which a data voltage is supplied and the first transistor.

9. The electronic device of claim 8, further comprising:

a voltage generator configured to supply the driving voltage to the plurality of pixels, wherein the voltage generator receives the luminance control signal from the driving controller and controls a voltage level of the driving voltage.

10. The electronic device of claim 8, wherein the panel driver includes a data driver configured to apply the data voltage to the display panel, and wherein the data driver includes:

a gamma voltage generation block configured to output a plurality of gamma voltages based on a gamma reference voltage; and a data conversion block configured to receive the plurality of gamma voltages and to convert image data into the data voltage based on the plurality of gamma voltages.

11. The electronic device of claim 10, further comprising:

a voltage generator configured to supply the gamma reference voltage to the gamma voltage generation block, wherein the voltage generator receives the luminance control signal from the driving controller and controls a voltage level of the gamma reference voltage.

12. A driving method of a display device, the method comprising:

receiving an image signal at a current frame rate;

comparing the current frame rate and a reference frame rate;

in response to the current frame rate being less than the reference frame rate, outputting a duty control signal;

controlling a current duty ratio of a current emission period of a display panel based on the duty control signal;

outputting a luminance control signal based on the current duty ratio; and controlling luminance of each of pixels provided in the display panel in response to the luminance control signal, wherein a reference frame operating at the reference frame rate includes a reference emission period, wherein a current frame operating at the current frame rate includes the current emission period, wherein the current frame rate is less than the reference frame rate, a duration of the current frame is greater than a duration of the reference frame, wherein the current duty ratio is a ratio of the current emission period to the duration of the current frame, wherein a reference duty ratio is a ratio of the reference emission period to the duration of the reference frame, wherein the current duty ratio is less than the reference duty ratio, and wherein a duration of the reference emission period is equal to a duration of the current emission period.

13. The method of claim 12, wherein, when the reference frame rate is p times the current frame rate, the current duty ratio is 1/p times the reference duty ratio.

14. The method of claim 12, wherein the outputting of the luminance control signal includes:

receiving a luminance correction value corresponding to the current duty ratio from a lookup table in which luminance correction values differently set depending on magnitudes of duty ratios are stored; and outputting the luminance control signal based on the luminance correction value.

15. The method of claim 12, wherein the controlling of the luminance includes:

controlling a voltage level of a driving voltage based on the luminance control signal; and applying the driving voltage to each of the pixels to control luminance of light that the pixels output.

* * * * *